Patented Feb. 10, 1942

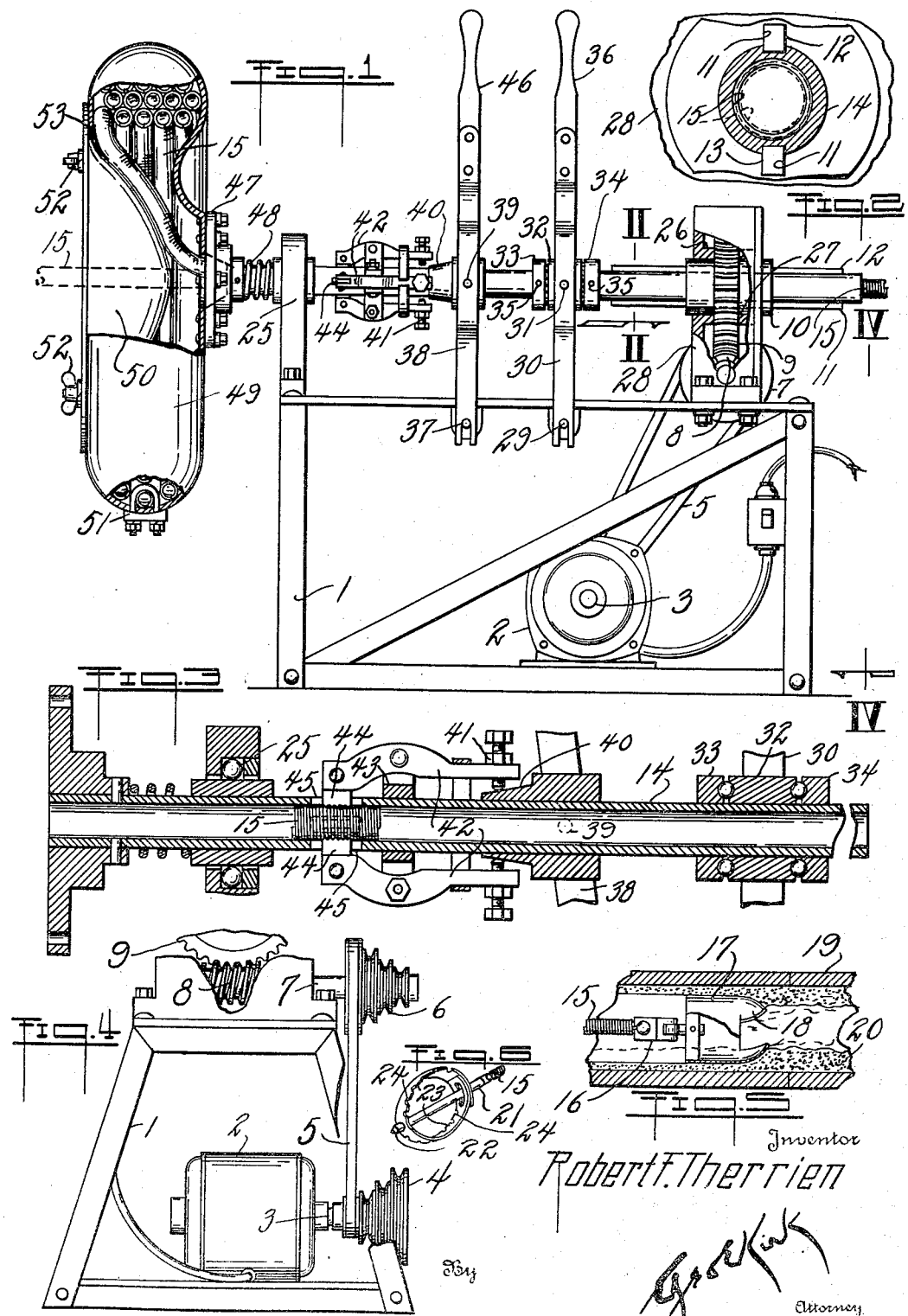

2,272,387

UNITED STATES PATENT OFFICE 2,272,387

CLEARWAY FOR CLOGGED DUCTS

Robert F. Therrien, Toledo, Ohio, assignor of one-half to Earl M. Myers, Toledo, Ohio Application June 9, 1938, Serial No. 212,857

2 Claims. (Cl. 15—104.30)

This invention relates to flow promotion in passages having accumulated therein resistance to normal flow.

This invention has utility in waste, sewer ducts or pipes for sediment release or freeing.

Referring to the drawing:

Fig. 1 is a side elevation, with parts broken away, of an embodiment of the invention as a power clog remover for sewers;

Fig. 2 is a section on the line II—II, Fig. 1, showing the power connection to the sleeve for effecting tool rotation;

Fig. 3 is a longitudinal section on the sleeve portion of the device of Fig. 1, showing mounting reciprocation rotation connections thereto;

Fig. 4 is a fragmentary view on the line IV—IV, Fig. 1, showing the multiple speed transmission connection from the motor to rotate the sleeve;

Fig. 5 is a fragmentary detail view of the terminal tool and its mounting as located in the sewer pipe; and Fig. 6 is a detail view of a terminal tool having radially movable arms.

Frame 1 provides base for motor 2 having shaft 3 carrying step pulley 4, from which extends belt 5 for coacting with step pulley 6 and transmitting variable speeds from the motor 2 to shaft 7 having worm 8 in mesh with worm gear 9 having hub 10 with diametrical ways 11 coacting with splines 12, 13, on sleeve 14. Extending from this sleeve 14 is flexible torsion transmission mounting means or snake 15, herein shown as wire helix closely wound. Terminally this helix carries coupling 16 for mounting tool 17, shown as comprising a cylindrical section having terminal concave teeth 18 effective in tool rotation in duct 19 of a sewer to attack sediment or accumulation 20 and loosen such for being readily flushed therefrom.

In effecting variable radius control for the tool, coupling 16 may mount stem 21 having terminal head 22 from which extends a pair of arched yieldable blades 23 having marginal teeth 24. Accordingly, as the speed for rotation is transmitted from the coil or flexible transmission 15, increased centrifugal action may be effective to urge these blades 23 outward into the sediment and thereby effect clearway enlargement beyond that which is for the contracted position of this tool. This means that there may be an initial low speed rotation boring through the material and subsequent high speed to enlarge such opening, or there may be initial low speed boring and, before progressing through, such followed by the higher speed rotation for fully enlarging as the tool operation is progressed.

This sleeve 14, as carried by the frame 1, is mounted in roller bearing 25. Bearings 26, 27, in housing 28 for the worm wheel 8 are effective through this worm wheel to carry this sleeve 14 remote from the bearing 25. The frame 1 has fulcrum 29 for hand lever 30 having pivotal connection 31 with loose ring 32 between antifriction thrust collars 33, 34, respectively held by pins 35 fixed against longitudinal movement relatively to the sleeve 14. Accordingly, by grasping the hand grip 36 of this lever 30, this lever may be swung on its fulcrum 29 and through such oscillation effect progress and retraction of the sleeve 14 relatively to the rotation-effecting drive wheel 9. Inasmuch as the transmission is herein shown as a helical coil the winding action thereon tends to reduce its effective diameter and in relaxing therefrom tends to cause such to enlarge. This has an automatic reaction effect as to the sleeve 14 for automatically clutching and releasing in the feeding action effective to progress the tool into the duct or sewer pipe. As the grip 36 is swung to the right during the rotation of the transmission 15, this tends to unwind such transmission. The clog or relative reduction of axial progress or speed reduction permits the speed decrease against resistance and tends to allow this torsion transmission means to have an increased diameter and there would be this automatic clutching with the sleeve 14 as it is shifted forward.

Due to the tendency toward increased resistance as the tool is progressed there is further winding action tending to reduce the effective diameter and thereby automatically release the sleeve for recovery independently of return or pull back for this transmission. The rotative speed may be as low as say 10 R. P. M. for arduous work as through a tortuous way and may be speeded up very considerably thereover by the step pulley or change speed into the transmission. This speed action may be up to approximately 100 R. P. M.

Should there be in the operation not sufficient resistance to effect automatic release of the sleeve from the feeding action due to the operation of the hand lever 30, 36, positive control to this end may be effective. For such purpose, fulcrum 37 on the frame 1 carries lever 38 having pivot pin 39 connected to clutch collar 40 shiftable into adjustable complementary clutch member 41 to rock levers 42 on collar 43 and thereby throw jaws 44 through openings 45 in the sleeve 14 for direct gripping action thereof on the transmission 15. Accordingly, in operating hand grip 46 of the lever 38 the feeding action of the operating lever 30, 36, may be positive in the forward shifting and the clutch lever be the controlling factor for the release and connection.

In this general operation the length of the transmission 15 may be fully and adequately controlled through this sleeve 14 especially for relatively short distances of clearing of ducts or way. When there is desired a reserve or to cover a greater range of activity say up to 100 to 150 feet, the sleeve 14 as beyond the bearing 25 may carry hub flange 47 spaced from the bearing 25 by compression helical spring 48, thereby acting as a buffer, in taking up or lengthening, from reciprocation of the lever 30, 36. This hub flange 47 is herein shown as carrying drum 49 having conical way 50 upon the tapering outward surface of which in drum 49 this transmission 15 may project outward and, due to its wire helix 15, tends to wind from the outside in of this drum 49, and as so wound therewith may have terminal anchor 51. In this assembly for this extended magazine supply the feed lever 30, 36, may pull off this drum 49 which additionally serves as a fly wheel in the power drive hereunder. As the feed operation is completed, wing nuts 52 may release the cone 50 so that the coil may be re-fed into the magazine of this drum 49. In instances where there is but a relatively short feed or it may not be desired to operate the drum, notwithstanding the drum be attached, there may be with the transmission 15 as in the drum out of the sleeve 14, a desired length of such transmission inserted through drum opening 53 as cleared by removing plate of the cone 50, thereby permitting such transmission 15 to be fed directly into the sleeve 14.

In practice with a fully clogged or impeded sewer, it is in order initially to develop passageway through, say of somewhat less diameter than the pipe interior. To this end, the terminal tool 17, 18 (Fig. 5), may be worked through, thereby tending to leave some of the clogging material within the duct or sewer. If it be desired more fully to cleanse the way after the flushing, this may be effected by the tool 21, 22, 23, 24 (Fig. 6). The arms 23 may be of some resilience and in some instances may normally even extend at the slow speed of rotation close to the duct interior wall. Due to the yieldable character of the blades or arms 23 as a more positive resistance is encountered, the slotted portions of the arms away from the terminus 22 allow for radial inward give to clear such positive impediment.

What is claimed and it is desired to secure by United States Letters Patent:

1. Duct interior cleaning means embodying a terminal tool, a flexible torsion transmitting snake for the tool, a sleeve through which the snake extends, a fixed frame mounting the sleeve, a power drive for rotating the sleeve, manually operable lever operating directly on said sleeve from said frame for reciprocating the sleeve relatively to the frame in controlling feed of the snake therefrom and means to releasably connect the snake to the sleeve, said latter means as released leaving the sleeve to rotate independntly of the snake and as connected rendering the lever effective in one direction of lever operation to feed the snake and in the other direction of lever operation to retract the snake, whether or not the sleeve be rotated from the power drive.

2. Duct interior cleaning means embodying a fixed frame, a motor in the frame, a speed reduction drive from the motor, inner and outer sleeve means carried by the frame and rotatable by the drive, flexible torsion transmission means through the inner sleeve and mounted for movement therewith, a terminal tool mounted on the protruding terminus of said torsion means, a rockable lever operating directly on said inner sleeve from said frame for sliding same relatively to the outer sleeve means and thereby urging the torsion means to progress, and means to grip the torsion means to the inner sleeve.

ROBERT F. THERRIEN.